Patented Nov. 19, 1929

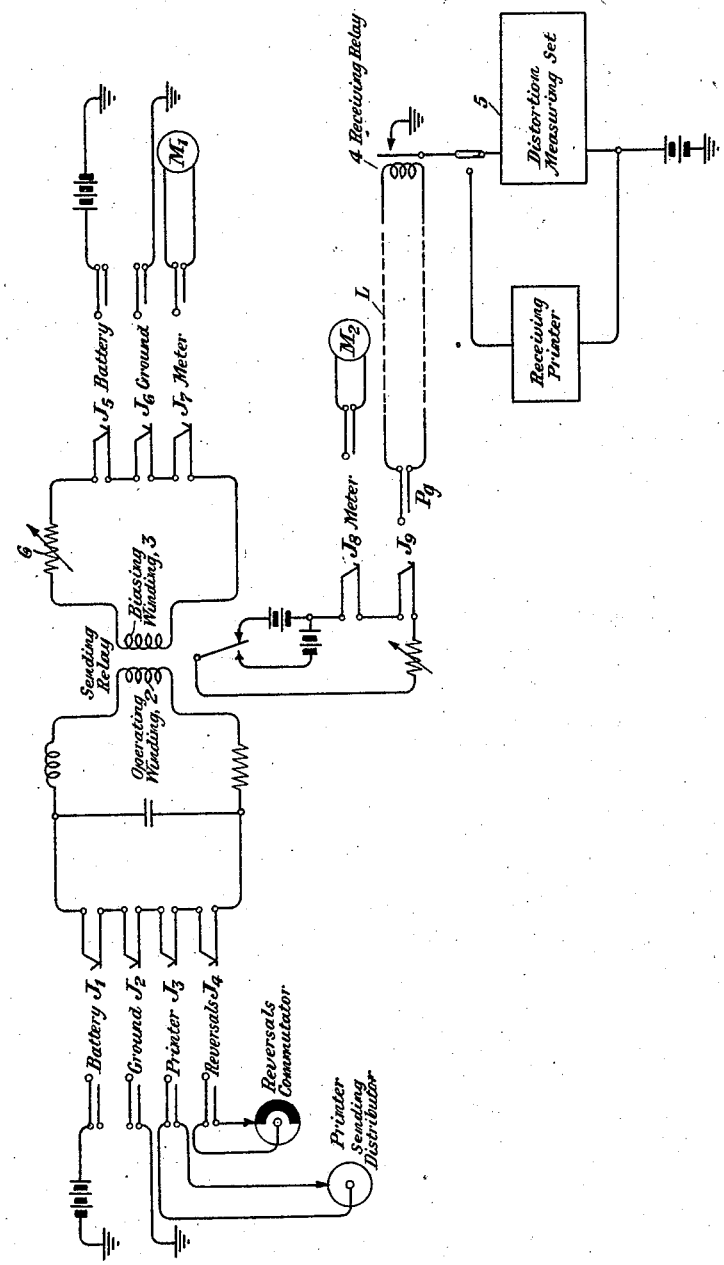

1,735,943

UNITED STATES PATENT OFFICE

EDWARD FISK WATSON, OF LARCHMONT, AND BURDETTE STEVENS SWEZEY, OF FLORAL PARK, NEW YORK, ASSIGNORS TO AMERICAN TELEPHONE AND TELEGRAPH COMPANY, A CORPORATION OF NEW YORK

METHOD OF AND MEANS FOR TESTING TELEGRAPH TRANSMISSION

Application filed January 20, 1928. Serial No. 248,117.

This invention relates to telegraph systems, and more particularly to improvements in methods of and means for measuring telegraph transmission by employing distorted signals rather than perfect signals.

In former methods of measuring telegraph transmission, which have been utilized, so-called "perfect signals" are usually employed at the sending end of the circuit and the lengthening or shortening of these signals due to imperfections of the circuit is measured at the receiving end. These measurements are sometimes made at several speeds and, in addition, a measurement may be made with a speed-of-failure meter. A fairly complete picture of the quality of transmission afforded by the circuit when "perfect signals" are impressed at the sending end, may be obtained by such methods. However, in many cases in practice, particularly where the circuit under test is merely part of a complicated network, the signals impressed are distorted. The primary object of the present invention is to provide a simple procedure for measuring the telegraph transmission capabilities of a circuit with the impressed signals distorted by known amounts as well as with perfect impressed signals. Another object is to provide arrangements for testing with non-repeating printer signals of the same type encountered in service as compared with using a repeating signal which in some cases is not as difficult to transmit. Another object is to use in measuring the receiving margins, a printer receiver of the same type used in service so as to obtain easily interpreted results as regards printer operation. Another object is to provide for testing the ability of receiving printer mechanisms to function on distorted line signals. Other features and objects of the invention will appear more fully from the detailed description thereof hereinafter given.

With reference to the distorted signals utilized in the arrangements of this invention, the question arises as to which component or components of distortion should be used. It is pointed out that with this invention it is possible to provide suitable circuits for introducing either bias, characteristic or fortuitous components or any combination of these into the signals to produce the type of distorted signal desired. However, it is probably more convenient to measure and to control bias than either of the other two components. Also, bias is a common cause of poor transmission and is comparatively easy to correct for in the field operation of telegraph circuits. Accordingly, in the testing method and arrangements of this invention, bias is introduced into the signals to produce the desired distorted type of signal utilized. However, the signals may be distorted by other means.

The telegraph transmission measuring method of the present invention in which distorted signals are used, involves introducing distortion into the signals either in predetermined amounts or in gradually increasing amounts and measuring the effect thereof by a receiving device, such as a distortion measuring set or a telegraph printer. This method has an advantage over methods involving the use of undistorted signals in that it affords a direct indication of the margin in transmission, i. e., of the ability of the circuit to handle distorted signals. In the method of this invention the distortion is impressed at the sending end of the circuit in order to determine the margin in the circuit. Determination of the margin in the circuit shows the permissible initial distortion in signals impressed at the sending end. Such a testing method and its accompanying results are particularly desirable in multi-section circuits where the signals at the sending end of some of the sections or circuits are distorted due to transmission over previous sections. In other words, the testing method of the invention makes it readily possible to ascertain how much distortion may be introduced in the signals prior to being sent over the circuit before the receiving apparatus will fail to properly function.

The invention may be more fully understood from the following description, together with the accompanying drawing, in the figure of which is shown a circuit diagram of a telegraph system to which the testing method and apparatus of this invention are applicable.

In the drawing is shown a transmission line L interconnecting a transmitting and receiving station. At the transmitting station is shown a portable test set for use with the arrangements of the invention. This test set includes the jacks $J_1$ to $J_9$, inclusive. Battery and ground may be connected to jacks $J_1$ and $J_2$. A telegraph printer sending distributor may be connected to jack $J_3$ and a source of reversals may be connected to jack $J_4$. These jacks are connected to the operating winding 2 of a sending relay, which is of the usual polar type. Connected to the biasing winding 3 of the sending relay is a variable resistance 6 and the jacks $J_5$, $J_6$ and $J_7$ to which may be connected, respectively, battery, ground and a meter. Connected in series with winding 2 is a retardation coil and a current limiting resistance. A condenser is bridged across the winding 2. The action of this inductance and condenser is to round off the wave shape of the signals through the relay winding when the circuit is opened and closed by the printer sending contacts which may be connected to jack $J_3$. When rounded off signals are sent through winding 2, signals with bias varying from about 66 per cent or more spacing to 66 per cent or more marking may be obtained from the relay contacts by varying the direct current flowing through biasing winding 3 by changing the variable resistance 6. The sending relay contacts are connected to the jacks $J_8$ and $J_9$. A meter may be connected to jack $J_8$ and the plug $P_9$ connected to a line circuit L may be connected to jack $J_9$. The line circuit L is connected to the winding of a receiving relay 4. The contact of receiving relay 4 controls a circuit through the distortion measuring set 5 or a receiving printer. The distortion measuring set 5 is well known in the art and is more completely illustrated in Patent #1,628,392, May 10, 1927, to S. I. Cory. Accordingly, it is only illustrated in schematic form herein. Receiving printer arrangements are also well known in the art.

The testing method of this invention, the purpose of which is to determine the margin in the line L, or how much distortion may be introduced in the signals at the transmitting station before the receiving station will fail to properly function, is as follows: A source of reversals, or perfect signals, may be connected to jack $J_4$ and the biasing current adjusted so that the meter $M_2$ plugged into jack $J_8$ will indicate perfect signals with the line plug removed from jack $J_9$. Then the line will be connected in jack $J_9$ and these signals transmitted over the line L. A reading will then be taken on the distortion measuring set 5, or the receiving printer. This will show the amount of distortion inherent in the line itself, or in other words, just how much distortion will be introduced into perfect signals by transmission over the line L. The variable resistance 6 may then be adjusted to introduce distortion in the form of bias into the signals. In accordance with the arrangements of this invention the amount of distortion introduced in the form of bias in the signals may be gradually increased until the distortion measuring set 5 or the receiving printer indicates that the maximum amount or limit has been reached at which the receiver will properly function. The distortion measuring set 5 will indicate the per cent of distortion or bias in the signals. For purposes of illustration, let it be assumed that it has been determined by experiment that with 50 per cent distortion as shown by set 5, the signals will operate the receiver but will not do so beyond this limit. Accordingly, if the bias is gradually increased at the sending station until device 5 gives an indication of such limit, then a reading of the bias introduced at the sending end at such time will give a direct indication of the margin of the circuit for transmitting distorted signals. The limit for the amount of distortion at the receiving end may be previously determined by experiment and may differ for various types of signals. In other words, the amount of distortion that manual signals might stand might be different from that in the case of printer signals. The testing method might also be slightly varied by introducing a fixed and arbitrary amount of bias instead of gradually increasing amounts. Upon the introduction into the signals of a fixed and known amount of bias a reading would be taken on distortion measuring set 5. A comparison of this reading with the known maximum limit in per cent would make it easily possible to estimate how much more or less than the fixed and arbitrary amount of bias might be introduced, and would indicate directly the margins for transmitting signals impressed with the known amount of bias.

While the invention has been disclosed in certain specific arrangements which are deemed desirable, it is understood that it is capable of embodiment in many and other widely varied forms without departing from the spirit of the invention, as defined by the appended claims.

What is claimed is:

1. The method of testing transmission in a telegraph circuit interconnecting a transmitting and a receiving station which comprises introducing distortion at the sending station into the signals transmitted over said line, measuring the percentage of distortion in such signals at the receiving station, and comparing this measurement and the amount of distortion introduced with the known maximum percentage of allowable distortion for such signals.

2. The method of testing transmission in a telegraph circuit interconnecting a transmitting and a receiving station which comprises introducing distortion at the sending station into the signals transmitted over said line, measuring the percentage of distortion in said signals at the receiver station, gradually increasing said introduced distortion until said measurements indicate the known maximum percentage of allowable distortion for such signals, and measuring at said sending station said distortion as finally introduced in said signals at said sending station.

3. The method of testing transmission in a telegraph system which comprises introducing an arbitrary amount of distortion into the signals sent over said system and measuring the distortion in said signals as received.

4. The method of testing transmission in a telegraph circuit interconnecting a printing telegraph transmitter and a printing telegraph receiver which comprises transmitting printer signals over said circuit, introducing distortion into said signals at the transmitter station, gradually increasing said introduced distortion until errors begin to occur in said printing telegraph receiver, and measuring the amount of distortion as finally introduced.

5. The method of testing transmission in a telegraph circuit interconnecting a printing telegraph transmitter and a printing telegraph receiver which comprises transmitting printer signals over said circuit, introducing a fixed known amount of distortion in said signals at the transmitter station, and measuring the margin of reception of said signals by said printer at the receiver station.

6. Telegraph testing apparatus including means for biasing telegraph signals and for measuring the introduced bias, comprising a source of reversals, a relay associated therewith, a biasing circuit for said relay, a circuit controlled by the contacts of said relay, and a meter included in said last mentioned circuit.

In testimony whereof, we have signed our names to this specification this 19th day of January, 1928.

EDWARD F. WATSON.
BURDETTE S. SWEZEY.